(No Model.)
J. R. McGREGOR & G. O. PERRY.
NAUTICAL SIGNAL.
No. 493,283. Patented Mar. 14, 1893.
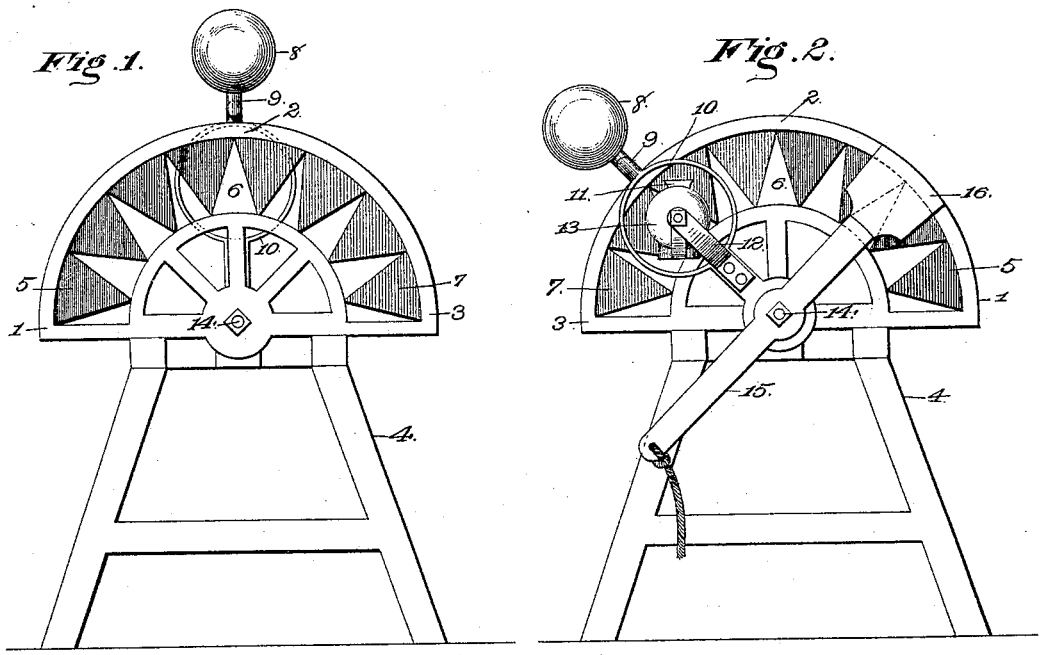
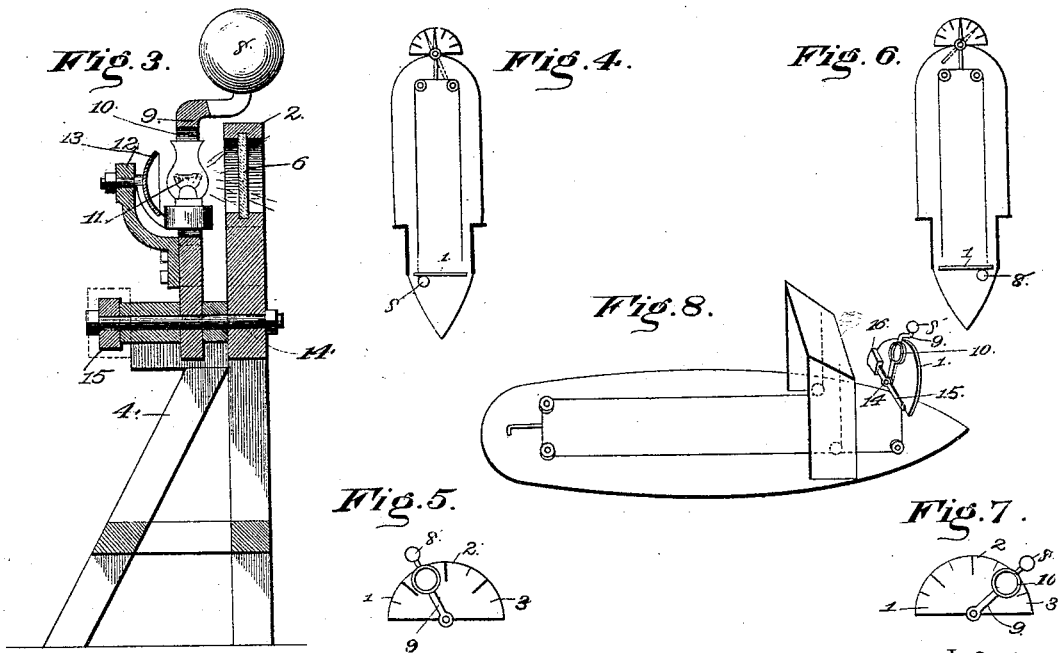
Witnesses
M. Fowler
Chas. S. Hyer
Inventors
Giles O. Perry and
James R. McGregor
By their Attorneys,
C. A. Snow & Co.

UNITED STATES PATENT OFFICE.

JAMES RODRICK McGREGOR AND GILES O. PERRY, OF CENTRALIA, WASHINGTON.

NAUTICAL SIGNAL.

SPECIFICATION forming part of Letters Patent No. 493,283, dated March 14, 1893.

Application filed July 16, 1892. Serial No. 440,251. (No model.)

*To all whom it may concern:*

Be it known that we, JAMES RODRICK MC-GREGOR and GILES O. PERRY, citizens of the United States, residing at Centralia, in the county of Lewis and State of Washington, have invented a new and useful Nautical Signal, of which the following is a specification.

This invention relates to nautical signals, and more especially to those adapted to be used to indicate the course of a vessel; and the object of the same is to provide improved means by which one vessel may signal another as to the exact course the vessel is sailing, and the exact position of a rudder, and is adapted to be used upon all navigable waters and on all vessels or crafts carrying steering apparatus.

A further object of the device is to provide a simple, convenient, and improved means for operating a code of signal lights.

With these ends in view, the invention consists primarily of a combination of colored glasses suitably mounted in a semi-circular framework forming a semi-circular disk or dial, and is graduated to correspond with the cardinal points of the compass, and is mounted on a suitable framework supporting also a combined index hand carrying a ship's lantern or other means of illumination so that the index hand and light will oscillate freely at the rear of the dial in such manner that the index hand always points to corresponding colors and points on the dial as indicated by the light given from the glass in the dial.

The invention consists further in the improved construction and combination of parts as hereinafter more fully described and claimed.

In the drawings:—Figure 1 is a front elevation of the signal in its normal position. Fig. 2 is a similar view looking from the rear and showing the device as moved to points from its normal position. Fig. 3 is a central vertical section of the device as shown in Fig. 1. Figs. 4, 5, 6, 7 and 8, are diagrammatic views showing the use of the device.

Referring to the drawings; wherein similar numerals of reference are used to designate corresponding parts in the several figures, the numerals 1, 2 and 3, represent the semi-circular stationary dial mounted on a suitable framework 4, and in which 5 represents red colored glass, 6 an open space or colorless glass, arranged in narrow triangular pieces radial to a common center and having their apices pointing outward, and between the said colors as shown, are green colored glasses 7; all of the said glasses in the dial, 1, 2 and 3, are made adjustable so that the dial may be graduated to correspond to at least the cardinal points of the compass.

The numerals 8, 9, 10 and 11, represent the combined index hand being arranged to oscillate freely in rear of the dial 1, 2, 3.

8 represents a ball or globe, or any suitable object that may serve best to be seen at a distance and at the same time, to act as an index hand for the said dial 1, 2, 3.

9 represents the arms supporting the globe 8 of the upper end thereof, and is provided with a circular opening or space 10, in which the light 11 is supported by an arm 12 in such manner that the light will always retain a central normal position, the said light being provided with a reflector 13.

The arm 9 is supported on a shaft 14, and as the said arm 9 has the arm 12 secured thereto, the said shaft thereby supports the combined index hand and light 8, 9, 10 and 11. To the outer end of the said shaft 14, an operating lever 15 is secured and has attached thereto a weight 16 located at the upper end thereof, and to the lower end of the said lever an operating attachment is adapted to be secured.

It will be seen that as the combined index hand and light 8, 9, 10 and 11, is caused to oscillate with the shaft 14, it is brought immediately into position at the rear of the colored glasses hereinbefore set forth, thereby positioning the light 11 in such manner as to produce a variation of the reflected colors as the operation and occasion may require. This effect is produced at night. It will further be seen that when the combined index hand and light 8, 9, 10 and 11, occupies such a position that the index hand 8 points to the center of the dial, the open space 6 in the semi-circular dial 1, 2 and 3, is immediately before the light 11; also when the index hand is caused to oscillate to the right, it brings the light 11 into position in the rear of a red glass 1, and the said index hand is located over a corresponding point on the red side of the said circular dial. Further, when the index hand is caused to operate to the left, it brings the light 11 into position at the rear of a green glass 7, and the said index hand is then located over a corresponding point on the green side of the semi-circular dial, or in other words, when the combined index hand and light is caused to oscillate in any direction, the index hand always points to a point or color on the semi-circular dial corresponding with the light indicated by the colored glass in the said semi circular dial.

The dial 1, 2, 3, is to be marked to correspond at least to the cardinal points of the compass, that is to say, the points in the triangular open space 6, or the white or colorless glasses on the said dial are twenty-two and one half degrees distant from each other, and the lever 15 is of such length, and is connected to the steering apparatus of the vessel in such manner, that when the rudder is turned at right angles to the line of the boat, the index hand will stand horizontal, the corresponding position between vertical and horizontal indicating the corresponding position of the rudder. Hence, the operation of the device will be as follows:—

A vessel coming straight toward the person signaled to, will present as a headlight the white light 6, and the index hand will be directly above or vertical, and the red and green signal light on the side of the pilot house will both be visible. If the course of the vessel is not directly toward the observer, one of these signal lights will be hidden, as will be readily understood by any person familiar with shipping. Supposing now the rudder of the approaching vessel is shifted to the starboard as seen in diagram in Fig. 4, so that while the observer is yet watching the vessel and calculating on her course, the latter is changed and hence new calculations must be made. By the connection between the rudder and the device as in Fig. 8, or any other suitable connections, a shifting of the rudder as seen in Fig 4 for twenty-two and one-half degrees will deflect the index hand to that side of the vessel twenty-two and one-half degrees over the dial, as seen in Fig. 5, and while the rudder is held at this angle, and the vessel is thus altering her course, the light presented will be a red light and above and slightly to the left will be seen the index hand, as indicated in Fig. 5. The red light in the semicircular dial indicates that the rudder is standing to the right of the center and that the vessel is turning to the starboard, and the deflection of the index hand indicates the extent to which the rudder is deflected; that is, if the index hand is moved to the first colorless triangular piece 6 to the left of the center in Fig. 1 it will be twenty-two and one-half degrees distant to the left of a vertical line through the axis of the device. In Fig. 6 is shown a rudder deflected forty-five degrees to the left and hence a vessel making a much sharper turn to the port; and in Fig. 7 is shown the index hand indicating properly the degree of the rudder's deflection. As long then as the light exposed is a white light, the index hand vertically above the approaching vessel is moving in a straight course. But if, while this position is observed the light becomes green, it is instantly known that the rudder has been moved to the left, and the vessel is about to turn to the port. This may disarrange calculations which have been made to pass the approaching vessel on that side, and if close upon the approaching vessel, it becomes highly interesting to know how rapidly that the vessel is turning to the port, or in other words to what angle the rudder has been deflected or changed. This can be ascertained by observing the degree of deflection of the index hand. If the vessel is at considerable distance it will be necessary to calculate about how many degrees the index hand has moved from the vertical, but if the signal is close, the face of the dial will indicate quite plainly between which the several colorless pieces 6, the index hand stands, and hence the exact deflection of the rudder; and in the daytime the device can be read a distance proportionate to its size.

While this signal should be placed on the bow, it is obvious that it could be located amidship or aft on both sides of the vessel in addition to its position on the dial, but the latter alone is preferred in order to prevent confusion. Thus it will be seen when this device is placed on board ship and in the most convenient place to be seen, and caused to work in unison and conjunction with the rudder of the ship, by direct or indirect attachment to any of the various means of operating the rudder, as by attaching the chain or rope 17 as seen in Fig. 8 to the chain or rope operating the rudder in the ordinary way, or to the wheel or windlass as the case may be, or by attaching direct or indirect to the steam or hydraulic method, it will always indicate by light or position of the index hand the exact position of the rudder.

The use of this device is quite obvious. If placed on board ship in a suitable place and attached to the working parts of the rudder so as to operate therewith in exact unison and conjunction with the same, and so arranged that the rudder cannot be moved without moving the signal correspondingly, it must necessarily follow that all vessels sailing in the same waters, or in sight of the signal either by way of light at night or by a view of the dial and index by day, are immediately and accurately apprised of the slightest tack or change of the rudder which the ship carrying the signal may make. Vessels approaching each other or passing at a quarterly direction or coming out of a fog are so exactly warned of each other's course that they can govern themselves accordingly thus avoiding collisions by always making a full clearance.

Having thus described the invention, what is claimed as new is—

1. The herein described signal comprising a semicircular dial mounted on a framework, and having white or transparent glasses with red and green glasses at the sides thereof arranged concentrically in said dial, and an oscillating hand carrying a white light and mounted on a shaft in rear of said dial, and connection between said shaft and rudder of the vessel as and for the purpose set forth.

2. In a nautical signal, the combination of a dial having glasses of different colors and an oscillating index hand carrying a light movable in rear of said dial, substantially as described.

3. The herein described nautical signal comprising an oscillating white light mounted on a shaft, a semi-circular stationary dial in front of said light having open spaces with red and green colored glasses at the sides thereof arranged concentrically in said dial, a lever centrally on said shaft and having one end weighted, and connection between its other end and the end of the vessel.

4. The herein described nautical signal comprising an oscillating white light mounted on a pivotal shaft centrally in a circular opening, an oscillating arm carrying an index hand, and connection between said shaft and the rudder of a vessel for deflecting said hand correspondingly with the movements of the rudder, substantially as described.

5. The herein described nautical signal comprising a light carried within an oscillating arm provided with a forward projecting index hand keyed on an oscillating shaft, a dial in front of said index hand and having graduations thereon, the dial being colored red at one side and green on the other side of a vertical line by means of colored glasses, and connection between said shaft and the rudder of a vessel for deflecting said index hand correspondingly with the movements of the rudder, substantially as described.

6. The herein described nautical signal comprising an oscillating light on an oscillating shaft journaled in bearings, an arm keyed on said shaft provided with an index hand at its outer end, and carrying said light within a circular opening thereof, a stationary dial in front of said light and provided with glasses colored red at one side of a vertical line and green at the other side thereof and having graduation marks, and connection between said shaft and the rudder of a vessel for deflecting said hand and said light correspondingly with the movements of the rudder, substantially as described.

7. The herein described nautical signal comprising an upright stationary dial supported by a framework, its face being colored red on one side and green on the other side of a vertical line by means of colored glasses, and having white or colorless triangular pieces for graduation marks pointing radially outward, an oscillating shaft journaled through the center of said dial, an arm keyed on said shaft bearing a light and a forwardly projecting index hand and moving over the outer and front edge of said dial, and connection between said shaft and the rudder of a vessel for deflecting said light and said hand correspondingly with the movements of the rudder, substantially as described.

8. The herein described nautical signal comprising an upright dial supported by a framework, its face being differently colored at opposite sides of a vertical line by means of colored glasses, and provided with graduation marks, an oscillating shaft mounted in bearings and extending through the center of the dial, an arm keyed on said shaft and moving at rear of said dial, a light carried by said arm and provided with a reflector, an index hand carried by said arm projecting forward and over said dial and moving over the outer edge of the latter, and connections between said shaft and the rudder of a vessel for deflecting said light and said hand correspondingly with the movements of the rudder, substantially as described.

9. In a nautical signal the combination of an oscillating white light provided with a reflector and mounted on an oscillated arm carrying a forwardly projecting index hand, and keyed on an oscillating shaft journaled in bearings supported by a framework, a stationary graduated dial carried by said framework in front of said light and having red and green glasses respectively on the right and left of a vertical line, said oscillating shaft projecting through the center of said dial, a lever weighted at one end keyed on said shaft, and connections between said shaft and the rudder of a vessel for deflecting the light and index hand correspondingly with the movements of the rudder substantially as set forth.

10. In a nautical signal, a dial stationarily supported and having colored glasses therein and open spaces or colorless glasses, and a white light movably supported in rear of said dial, substantially as described.

In testimony that we claim the foregoing as our own we have hereto affixed our signatures in the presence of two witnesses.

JAMES RODRICK McGREGOR.
GILES O. PERRY.

Witnesses:
MILLER MURDOCH,
G. B. RICHMOND.